United States Patent
Scheper et al.

(10) Patent No.: US 9,630,470 B2
(45) Date of Patent: Apr. 25, 2017

(54) STABILIZER FOR A MOTOR VEHICLE AND METHOD FOR PRODUCING THE SAME

(71) Applicant: ZF FRIEDRICHSHAFEN AG, Friedrichshafen (DE)

(72) Inventors: Frank Scheper, Loeningen (DE); Stefan Holtz, Huede (DE); Xiaocen Wang, Lemförde (DE)

(73) Assignee: ZF Friedrichshafen AG, Friendrichshafen (DE)

( * ) Notice: Subject to any disclaimer, the term of this patent is extended or adjusted under 35 U.S.C. 154(b) by 0 days.

(21) Appl. No.: 14/916,603

(22) PCT Filed: Aug. 15, 2014

(86) PCT No.: PCT/EP2014/067472
§ 371 (c)(1),
(2) Date: Mar. 4, 2016

(87) PCT Pub. No.: WO2015/036200
PCT Pub. Date: Mar. 19, 2015

(65) Prior Publication Data
US 2016/0193891 A1    Jul. 7, 2016

(30) Foreign Application Priority Data

Sep. 13, 2013 (DE) .................. 10 2013 218 413

(51) Int. Cl.
*B60G 21/055*  (2006.01)
*B23K 9/02*  (2006.01)
(Continued)

(52) U.S. Cl.
CPC ............ *B60G 21/055* (2013.01); *B23K 9/025* (2013.01); *B23K 9/0216* (2013.01);
(Continued)

(58) Field of Classification Search
CPC ...... B60G 2206/427; B60G 2206/8201; B60G 2206/82013; C21D 7/13; C21D 8/00; C21D 8/005
See application file for complete search history.

(56) References Cited

U.S. PATENT DOCUMENTS 5,567,335 A * 10/1996 Baessler ................ B23K 13/02
219/59.1
5,622,242 A *  4/1997 Handke ................... B60G 7/04
188/322.19
(Continued)

FOREIGN PATENT DOCUMENTS

DE        1 540 883        1/1970
DE        227 067 A1       9/1985
(Continued)

OTHER PUBLICATIONS

German Search Report Corresponding to 10 2013 218 413.1 mailed Oct. 22, 2013.
(Continued)

*Primary Examiner* — James English
(74) *Attorney, Agent, or Firm* — Davis & Bujold, PLLC; Michael J. Bujold

(57) ABSTRACT

A method of producing a stabilizer (10) of a motor vehicle, such that the stabilizer includes a torsion bar (11) and longitudinal links (12, 13). The longitudinal links (12, 13) are in each case connected to the torsion bar (11) by welding, and the longitudinal links (12, 13) and the torsion bar (11) are heat-treated before welding. Each longitudinal link (12, 13) is welded at one end to the torsion bar (11) on both sides, in each case, by a respective multilayer weld seam (14), and each weld seam (14) is made with unequal widths such that the width of the weld seam (14) adjacent to the torsion bar (11) is shorter than its width adjacent to the respective longitudinal link (12, 13).

18 Claims, 3 Drawing Sheets

Figure 1:
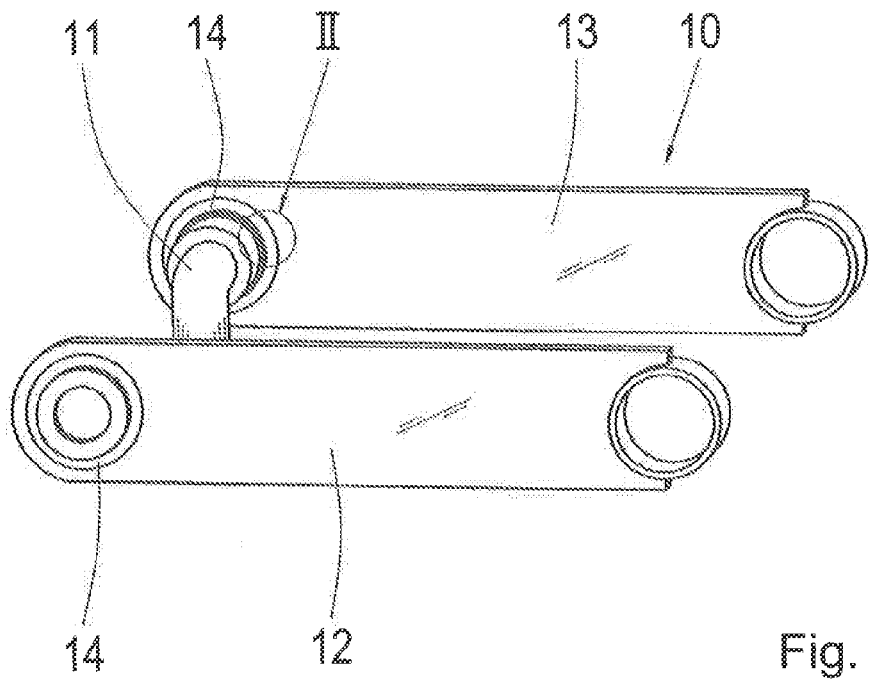

(51) Int. Cl.
*B23K 9/028* (2006.01)
*B23K 9/173* (2006.01)
*B23K 9/235* (2006.01)
*B23K 9/025* (2006.01)
*B23K 9/16* (2006.01)
*B23K 35/32* (2006.01)
*C21D 6/00* (2006.01)
*C21D 7/06* (2006.01)
*C21D 8/00* (2006.01)
*C21D 9/00* (2006.01)
*C22C 27/04* (2006.01)
*C22C 38/32* (2006.01)
*C22C 38/38* (2006.01)
*B23K 103/04* (2006.01)
*B24C 1/10* (2006.01)

(52) U.S. Cl.
CPC .............. *B23K 9/0288* (2013.01); *B23K 9/16* (2013.01); *B23K 9/173* (2013.01); *B23K 9/235* (2013.01); *B23K 35/32* (2013.01); *C21D 6/002* (2013.01); *C21D 6/005* (2013.01); *C21D 7/06* (2013.01); *C21D 8/005* (2013.01); *C21D 9/0068* (2013.01); *C22C 27/04* (2013.01); *C22C 38/32* (2013.01); *C22C 38/38* (2013.01); *B23K 2203/04* (2013.01); *B24C 1/10* (2013.01); *B60G 2206/427* (2013.01); *B60G 2206/72* (2013.01); *B60G 2206/8201* (2013.01); *B60G 2206/8401* (2013.01); *B60G 2206/8403* (2013.01)

(56) References Cited

U.S. PATENT DOCUMENTS

| | | | | |
|---|---|---|---|---|
| 5,814,784 A | * | 9/1998 | Kinsman | B23K 26/032 219/121.6 |
| 6,365,865 B1 | * | 4/2002 | Kurokawa | B23K 11/002 219/59.1 |
| 6,444,946 B1 | * | 9/2002 | Korte | B29C 66/73921 219/121.6 |
| 6,637,642 B1 | * | 10/2003 | Lingnau | B23K 13/00 219/601 |
| 6,682,610 B1 | * | 1/2004 | Inoue | B21C 37/06 148/519 |
| 2004/0188394 A1 | * | 9/2004 | Becker | B23K 26/60 219/121.64 |
| 2008/0277398 A1 | * | 11/2008 | Wilson | B23K 9/02 220/560.04 |
| 2011/0025013 A1 | * | 2/2011 | Kuroda | B60G 21/0551 280/124.152 |
| 2011/0031712 A1 | * | 2/2011 | Bitz | B60G 21/051 280/124.106 |
| 2011/0084547 A1 | * | 4/2011 | Ehrlich | B60G 21/051 301/127 |
| 2011/0198820 A1 | | 8/2011 | Janzen et al. | |
| 2015/0360317 A1 | * | 12/2015 | Kalvala | B23K 20/1265 228/2.3 |

FOREIGN PATENT DOCUMENTS

| | | |
|---|---|---|
| DE | 197 58 292 A1 | 11/1998 |
| DE | 10 2009 019 320 A1 | 11/2010 |
| DE | 10 2010 044 799 A1 | 4/2012 |
| EP | 1 712 379 A1 | 10/2006 |
| JP | S53-140245 A | 12/1978 |
| JP | 2008-142768 A | 6/2008 |

OTHER PUBLICATIONS

International Search Report Corresponding to PCT/EP2014/067472 mailed Dec. 8, 2014.
Written Opinion Corresponding to PCT/EP2014/067472 mailed Dec. 8, 2014.

* cited by examiner

STABILIZER FOR A MOTOR VEHICLE AND METHOD FOR PRODUCING THE SAME

This application is a National Stage completion of PCT/EP2014/067472 filed Aug. 15, 2014, which claims priority from German patent application serial no. 10 2013 218 413.1 filed Sep. 13, 2013.

FIELD OF THE INVENTION

The invention concerns a method for producing a stabilizer for a rotor vehicle. In addition, the invention concerns a stabilizer for a motor vehicle.

BACKGROUND OF THE INVENTION

The basic structure and basic mode of operation of a stabilizer for a motor vehicle are known from practice. Thus, a stabilizer serves to improve the road holding. A stabilizer comprises a torsion bar with longitudinal links connected on both sides of the torsion bar, the torsion bar itself being connected with a body of a motor vehicle and the longitudinal links being connected with the wheel suspensions. The torsion bar of the stabilizer is also known as the stabilizer tube and the longitudinal links of the stabilizer are also known as anti-roll bars. From practice it is already known to weld the longitudinal links or anti-roll bars to the torsion bar or stabilizer tube. For this, in stabilizers known from practice the procedure adopted is first to weld the longitudinal links made from a spring steel to the torsion bar also made from a spring steel, and then heat treat the welded unit consisting of the longitudinal links and the torsion bar in a hardening furnace. When after the welding of the longitudinal links to the torsion bar the stabilizer is heat treated as a unit, relatively large hardening furnaces are needed. This is disadvantageous.

SUMMARY OF THE INVENTION

Starting from there, the purpose of the present invention is to provide a new type of method for producing a stabilizer for a motor vehicle and a new type of stabilizer.

This objective is achieved by a method described below. According to the invention, the two longitudinal links and the torsion bar are heat treated before welding and then welded after being heat treated, in such manner that each longitudinal link is welded to the torsion bar at one end on both sides in each case by a multilayer weld seam, and wherein the weld seams are not of equal width, such that the width of the respective weld seam adjacent to the torsion bar is in each case shorter than that of the weld seam adjacent to the respective longitudinal link.

The invention proposes that the longitudinal links and the torsion bar of a stabilizer are heat treated before welding, so that the longitudinal links and the torsion bar are only welded after being heat treated. In this case, each previously heat treated longitudinal link is welded at one end, on both sides, to the previously heat treated torsion bar, in each case with a multilayer weld seam, such that the respective weld seams are not of equal width. The width of the respective weld seam adjacent to the torsion bar is shorter than that of the weld seam adjacent to the respective longitudinal link, so that the weld seam areas adjacent to the torsion bar are shorter than those adjacent to the longitudinal link in each case.

By virtue of the invention, to form a stabilizer it is possible to weld previously heat treated longitudinal links or anti-roll bars to a previously heat treated torsion bar or previously heat treated stabilizer tube, and this indeed, so as to provide a stabilizer with the desired operational strength. Owing to the fact that the weld seam widths are not equal, geometrical notches of the weld seams and internal material notches of the weld seams can be decoupled and displaced to areas of less severe loading. Because of that the desired operational strength and a long service life of the stabilizer made can be ensured.

Preferably, each weld seam is made with unequal widths in such manner that a ratio $X=I/L$ between the width I of the respective weld seams adjacent to the torsion bar and the width L of the weld seams adjacent to the respective longitudinal links is equal to between 0.36 and 0.8, in particular between 0.5 and 0.8 and preferably between 0.6 and 0.7. This is particularly preferred in order to decouple geometrical notches and internal material notches of the weld seams.

In an advantageous further development each weld seam is made with at least three layers, namely a root layer, at least one intermediate layer and a covering layer, wherein the root layer, the—or each—intermediate layer and the covering layer are made with the help of metal-active-gas welding using individual welding parameters, in such manner that the resulting weld seam has a hardness between 200 and 300 HV1 both in the area of the weld material and in the area of the heat-affected zone.

The multilayer formation of the weld seams using metal-active-gas welding with individual welding parameters for the individual layers of the weld seams is particularly preferred, in order to decouple the geometrical notches and internal material notches and to provide a stabilizer control element with the desired operational strength.

Preferably, for the root layer a welding torch with a welding current between 240 and 340 A and a welding voltage between 29 and 33 V is used, the components to be welded being moved relative to the fixed welding torch at a speed between 0.30 and 0.50 m/min. For the—or each—intermediate layer the welding torch is operated with a welding current between 230 and 340 A and a welding voltage between 28 and 31 V, the components to be welded are moved relative to the welding torch at a speed between 0.25 and 0.40 m/min, and the welding torch undergoes an oscillating movement perpendicular thereto with a relatively small amplitude. For the covering layer the welding torch is operated with a welding current between 210 and 315 A and a welding voltage between 27 and 31 V, the components to be welded are moved relative to the welding torch at a speed between 0.20 and 0.55 m/min, and the welding torch undergoes an oscillating movement perpendicular thereto with a relatively large amplitude. The above welding parameters for the metal-active-gas welding of the individual layers of the weld seams are particularly preferred.

Preferably, immediately before welding the longitudinal links and the torsion bar are preheated to a temperature between 120° and 150° C., and after the welding the longitudinal links and the torsion bar undergo shot-peening to harden them. The preheating of the assembly to be welded enables the operational strength to be increased further. Likewise, the shot-peening after welding further increases the operational strength of the stabilizer.

Preferably, at least one covering layer of the respective weld seam merges tangentially into the torsion bar and preferably also tangentially into the respective longitudinal link.

The stabilizer according to the invention is described below.

BRIEF DESCRIPTION OF THE INVENTION

Preferred further developments of the invention emerge from the description given below. Example embodiments of the invention, to which it is not limited, are explained in more detail with reference to the drawing, which shows:

FIG. 1: A schematic view of a stabilizer for a motor vehicle; and

Figure 2:
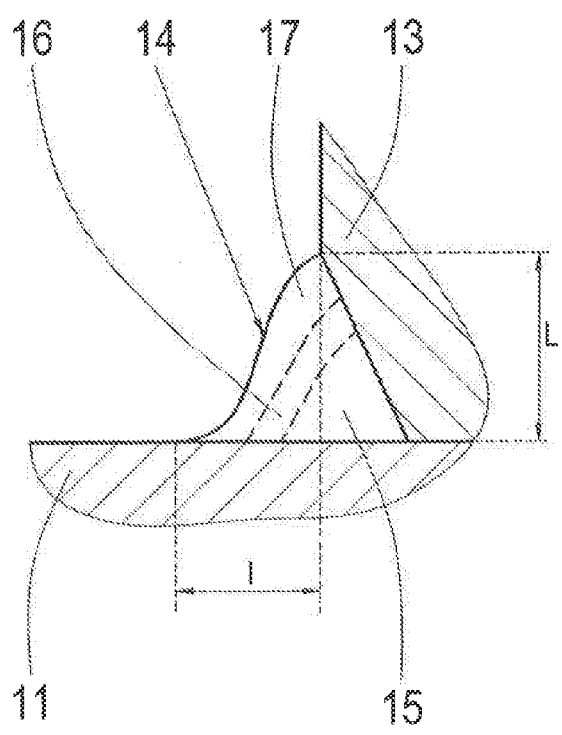
Figure 3:
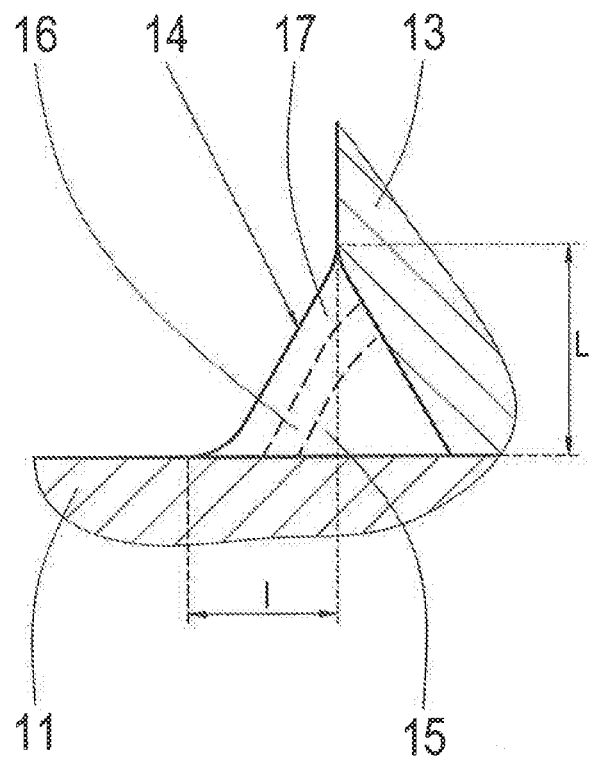
Figure 4:
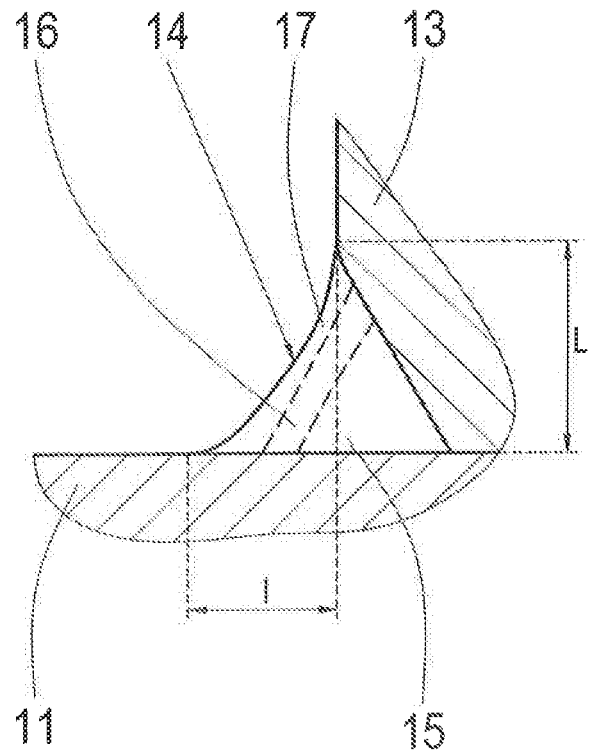

FIG. 2: The detail II of FIG. 1, showing the stabilizer in the area of a weld seam formed between a torsion bar and a longitudinal link;

FIG. 3: A detail II corresponding to FIG. 2 with a straight contour of the weld seam;

FIG. 4: A further detail II corresponding to FIG. 2, with the weld seam made with an elliptical contour; and FIG. 5: A further detail II corresponding to FIG. 2, with the weld seam made with an elliptical contour and also showing the heat-affected zone, the geometrical notches and the material notches.

DETAILED DESCRIPTION OF THE PREFERRED EMBODIMENTS

The present invention concerns a stabilizer for a motor vehicle and a method for producing such a stabilizer.

FIG. 1 shows a very schematic perspective view of a stabilizer 10 for a motor vehicle. Such a stabilizer 10 comprises a torsion bar 11 and longitudinal links 12, 13. The torsion bar 11 is also known as a stabilizer tube and the longitudinal links 12, 13 are also known as anti-roll bars.

At each end of the torsion bar 11 a respective training arm 12, 13 is connected at one end. At the respective ends, the longitudinal links 12, 13 are welded to the corresponding ends of the torsion bar 11 on both sides by forming weld seams 14.

In FIG. 1 only two weld seams 14 can be seen, namely one weld seam in the area of the longitudinal link 12 and one weld seam 14 in the area of the longitudinal link 13.

On the sides of the two longitudinal links 12, 13 not visible in FIG. 1 weld seams 14 of this type are also formed, so that to weld the two longitudinal links 12, 13 to the torsion bar 11 a total of four weld seams are formed.

In FIG. 1 the weld seams 14 are of circular shape and thus extend in the connection zone between the respective longitudinal link 12, 13 and the torsion bar 11 in a circle around the torsion bar 11.

In the context of the present invention it is proposed that to produce such a stabilizer 10, first a previously heat treated torsion bar 11 and previously heat treated longitudinal links 12, 13 are prepared, which are heat treated before the welding process, so that these structures are only welded after they have been heat treated.

Then, each previously heat treated longitudinal link 12, 13, at the end thereof at which it is to be connected with the previously heat treated torsion bar 11, is welded to the torsion bar 11 on both sides in each case with a weld seam 14, each such weld seam 14 being formed as a multilayer seam.

Moreover, each weld seam 14 is not formed with layers of equal width, but in such manner that the width of the weld layer 14 adjacent to the torsion bar 11 is shorter than the width adjacent to the respective longitudinal link 12 or 13.

FIG. 2 shows the detail II of the stabilizer in FIG. 1 in the area of a weld seam 14, and from FIG. 2 it can be seen that adjacent to the torsion bar 11 the weld seam 14 has a width I whereas adjacent to the respective longitudinal link 13 it has a width L. The end of the respective longitudinal link 12 or 13 has in each case a chamfer. The weld seam 14 is a HV seam.

Since the longitudinal links 12, 13 are welded at their respective ends to the corresponding ends of the torsion bar 11 on both sides with the formation of a weld seam 14, a double-HV seam is formed on each longitudinal link 12, 13.

The respective chamfer of the longitudinal link 12, 13 concerned is not taken into account when determining the width I. Accordingly, the width I of the weld seam 14 adjacent to the torsion bar 11 is measured relative to the non-chamfered surface of the longitudinal link 12 or 13.

The width I of the weld seam 14 adjacent to the torsion bar 11 is shorter than the width L of the weld seam 14 adjacent to the longitudinal link 13, such that a ratio $X=I/L$ between the width I of the weld seam 14 adjacent to the torsion bar 11 and the width L of the weld seam 14 adjacent to the longitudinal link 13 has a value between 0.36 and 0.8. In particular, the ratio $X=I/L$ is between 0.5 and 0.8. Preferably, the ratio $X=I/L$ is between 0.6 and 0.7.

A design of the weld seams 14 between the longitudinal links 12, 13 and the torsion bar 11 corresponding to this unsymmetrical configuration is preferred, in order to produce a stabilizer 10 with sufficiently high operational rigidity after the welding of the previously heat treated longitudinal links 12, 13 to the previously heat treated torsion bar 11. The unequally wide arms of the meld seams 14 make it possible to decouple a geometrical notch of the weld seam 14 concerned from an internal material notch of the weld seam 14.

The geometrical notches of a weld seam 14 are the respective transitions of the weld seam 14 in each case, on the one hand to the longitudinal link 12, 13 concerned and on the other hand to the torsion bar 11.

The internal material notches of the weld seams 14 are the transitions between the basis material of the structures to be welded, the so-termed weld material zone of the weld seam 14 concerned, and the heat-affected zones that form between the weld material zone and the basis material of the structures to be welded in each case.

Each weld seam 14 is preferably made with three layers, such that each weld seam 14 has at least one root layer 15, at least one intermediate layer 16 and a covering layer 17. Particularly preferred is a design in which each weld seam 14 consists of three layers so that each weld seam 14 then contains one root layer 15, one intermediate layer 16 and one covering layer 17.

The root layer 15, the—or each—intermediate layer 16 and the covering layer 17 are made with the help of metal-active-gas (MAG) welding, wherein for each of the above three different layer types individual welding parameters are used in order to produce a weld seam 14 which has a hardness between 200 and 300 HV1 both in the weld material zone and in the so-termed heat-affected zones. The hardness values referred to are so-termed Vickers hardness values.

As explained above, in three-layer weld seams 14 the root layer 15, the intermediate layer 16 and the covering layer 17 are in each case produced by metal-active-gas welding under a protective gas atmosphere.

In this case, to produce the root layer 15 a welding torch is operated with a welding current between 240 and 340 amperes (A) and a welding voltage between 29 volts and 33 volts (V), in such manner that the components to be welded, i.e. the respective longitudinal links 12 and 13 to be welded to the torsion bar 11, are moved past the fixed welding torch at a speed between 0.30 and 0.50 meters per minute (m/min).

When forming the intermediate layer 16 of the weld seam 14 concerned, the welding torch is operated with a welding current between 230 A and 340 A and a welding voltage between 28 V and 31 V, while the components to be welded are moved relative to the fixed welding torch at a speed between 0.25 m/min and 0.40 m/min and, furthermore, the welding torch undergoes an oscillation movement of relatively small amplitude perpendicularly to this forward movement.

To form the covering layer of each weld seam 14 the welding torch is operated with a welding current between 210 A and 315 A and a welding voltage between 27 V and 31 V, while the components to be welded are moved relative to the fixed welding torch at a speed between 0.20 m/min and 0.55 m/min and the welding torch undergoes an oscillation movement of relatively large amplitude perpendicularly to the relative movement.

Between the welding of the root layer 15 and that of the intermediate layer 16, and also between the welding of the intermediate layer 16 and that of the covering layer 17 of each weld seam 14, in each case a welding interval preferably between 20 and 120 seconds is interposed.

Typically, the welds connecting the longitudinal links 12, 13 to the torsion bar 11 are made successively in time one after the other, so that four weld seams 14 are formed in succession.

Before welding, the torsion bar 11 and the longitudinal links 12, 13 are preheated to a process temperature, preferably of between 120° C. and 150° C.

After the welding of the above structures, i.e. after the two longitudinal links 12, 13 have been welded to the torsion bar 11, the welded unit is subjected to a peening treatment in order to harden it, eliminate negative internal stresses and produce compressive stresses in the stabilizer 10 which increase its life. The strengthening peening treatment is preferably shot peening.

Each of the layers 15, 16 and 17 of the weld seam 14 is formed as a weld bead.

The torsion bar 11 and the two longitudinal links 12, 13 of the stabilizer 10 are typically made from a spring steel, such as steel of the type denoted as 33 MnCrB5-2+QT.

As already explained, the torsion bar 11 and the two longitudinal links 12, 13 of the stabilizer 10, which are made from a spring steel of such type, are heat treated before being welded.

As also explained earlier, welding is carried out under a protective gas atmosphere such that for welding, preferably a protective gas is used which contains a defined mixture of argon and carbon dioxide. Preferably, a protective gas of gas category M21 is used.

For welding, a welding filler is used, which is a steel alloy containing at least manganese, nickel and molybdenum as alloying constituents.

Preferably a welding filler in wire form is used, namely a welding filler material of the type denoted as G69 6 M Mn4Ni1.5CrMo.

Although the use of such a welding filler for welding the longitudinal links 12, 13 to the torsion bar 11 made from the above-described spring steel is preferred, it should be pointed out here that a different welding filler can also be used. Likewise, a different protective gas can also be used for welding.

Thus, according to the invention previously heat treated longitudinal links 12, 13 are welded to a previously heat treated torsion bar 11 to form a stabilizer 10 for a motor vehicle, using multilayer weld seams 14 of unequal width. Furthermore, for the welding defined welding parameters individually chosen for each of the layers 15, 16 and 17 are used. This makes it possible to decouple material notches and geometrical notches within the weld seam 14.

Material notches can be displaced to the area where loading is less severe. A homogeneous hardness gradation can be produced, which results in more ductile material behavior in the area of the geometrical notches of the weld seams 14 and consequently in improved crack propagation behavior.

As already explained, the invention concerns on the one hand the method for producing the stabilizer 10 and on the other hand the stabilizer 10 itself. The stabilizer 10 comprises the torsion bar 11 and the longitudinal links 12, 13, each of the latter welded at one end, on both sides and with respective multilayer weld seams 14, to the torsion bar 11. Each weld seam 14 has sides of unequal width and consists of at least three layers, namely the innermost, root layer 15, the outer, covering layer 17 and, positioned between the inner, root layer 15 and the outer, covering layer 17, at least one intermediate layer 16. Each of the layers 15, 16, 17 is preferably formed as a weld bead.

In FIG. 2 the weld seams 14 have a surface of S-shaped cross-section in the area of the covering layer 17, which merges tangentially into a surface of the torsion bar 11. The weld seams 14 are free from notches.

Analogously to FIG. 2, FIGS. 3 and 4 show examples of possible alternative contours of the weld seams 14.

In FIG. 3 the weld seams 14 have a surface with a straight cross-section in the area of the covering layer 17, which preferably in each case merges tangentially into the respective surfaces of the torsion bar 11 and the two longitudinal links 12, 13.

In FIG. 4 the cross-section of the weld seams 14 in the area of the covering layer 17 is of elliptical shape, which preferably in each case again merges tangentially into the respective surfaces of the torsion bar 11 and the two longitudinal links 12, 13.

The tangential merging at least of the covering layer 17 of the weld seam into the surfaces of the torsion bar 11 and the two respective longitudinal links 12, 13 is preferred in order to reduce the effect of geometrical notches.

Each weld seam 14 is preferably made with sides of unequal width, such that the value of the ratio $X=I/L$ between the width I of the weld seam 14 adjacent to the torsion bar 11 and the width L of the weld seam 14 adjacent to the longitudinal link 12, 13 is between 0.36 and 0.8.

In particular the ratio $X=I/L$ is between 0.5 and 0.8.

Preferably, the ratio $X=I/L$ is between 0.6 and 0.7.

Figure 5:
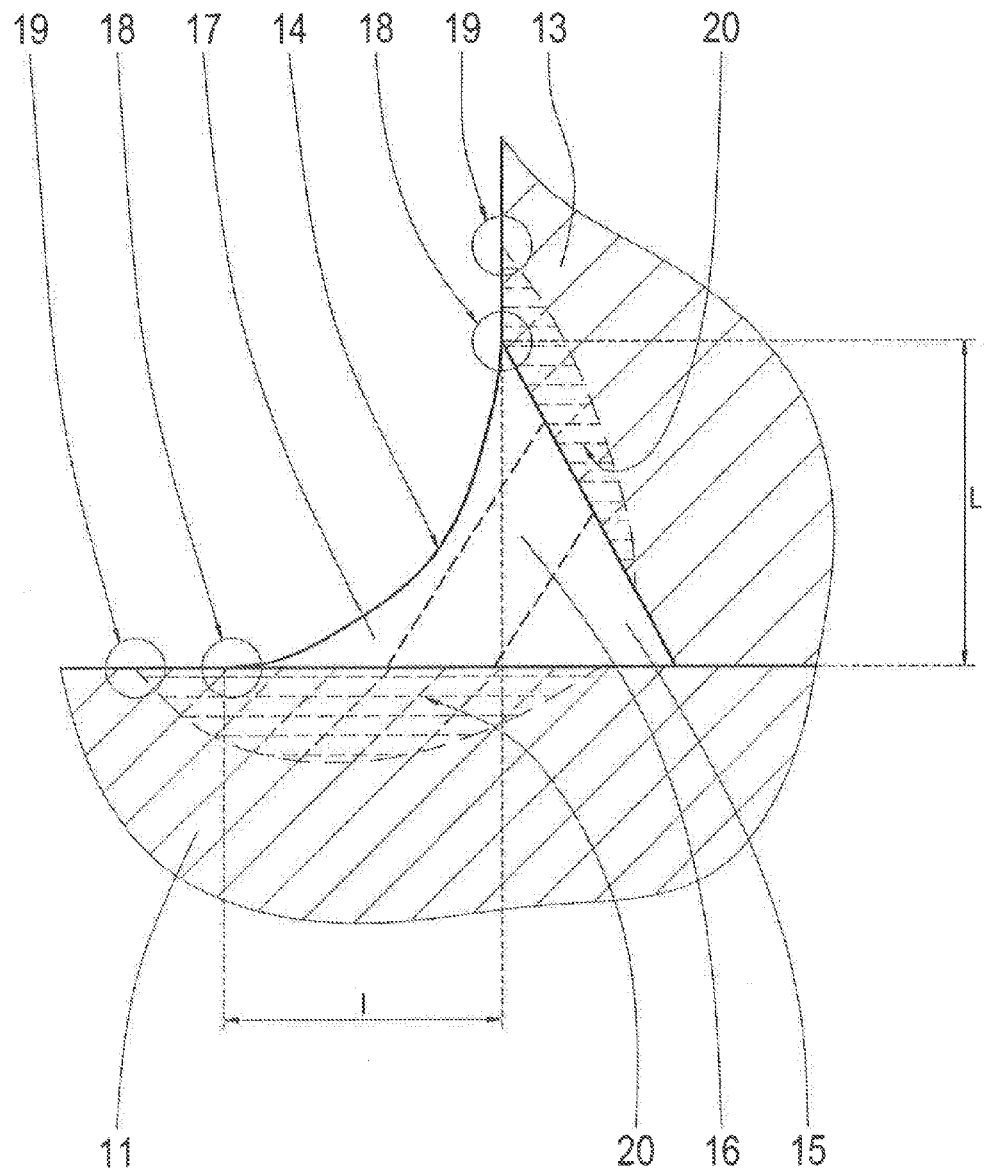

As already mentioned, the invention enables geometrical notches of the weld seams 14 to be decoupled from internal material notches of the weld seams 14 and displaced to areas of less severe loading. The geometrical notches of a weld seam 14 are the transitions of the weld seam 14 concerned on the one hand to the respective longitudinal link 12, 13 and on the other hand to the torsion bar 11. In FIG. 5 the areas of geometrical notches 18 are indicated. The internal material notches 19 of the weld seams 14, which are also indicated in FIG. 5, are transitions between the basis material of the structures to be welded, the so-termed weld material area of the weld seam 14 concerned, and the heat-affected zones 20 formed between the weld material concerned and the respective basis material of the structures to be connected. It can be seen from FIG. 5 that the geometrical notches 18 and the internal material notches 19 do not coincide. A homogeneous hardness gradation can be produced, particularly in the area of the geometrical notches.

The inhomogeneous hardness increase between the basis material and the heat-affected zones is displaced to areas of less severe loading.

The hardness of the respective weld seams 14, both in the weld material area 16 as also in the so-termed heat-affected zones 20 formed between the weld material area and the basis material of the structures 11, 13 or 11, 12 welded to one another, amounts to between 200 HV1 and 300 HV1.

INDEXES

10 Stabilizer
11 Torsion bar
12 Longitudinal link
13 Longitudinal link
14 Weld seam
15 Root layer
16 Intermediate layer
17 Covering layer
18 Geometrical notch
19 Material notch
20 Heat-affected zone

The invention claimed is:

1. A method of producing a stabilizer (10) of a motor vehicle such that the stabilizer includes a torsion bar (11) and longitudinal links (12, 13), and the longitudinal links (12, 13) being, in each case, connected to the torsion bar (11) by welding, the method comprising:
   heat-treating the longitudinal links (12, 13) and the torsion bar (11) before welding and, after the heat treatment, welding the longitudinal links to the torsion bar, welding each longitudinal link (12, 13), at one end, to the torsion bar (11) on both sides, in each case, by respective multilayer weld seams (14), and
   making each of the weld seams (14) with unequal widths such that a width of the weld seam (14) adjacent to the torsion bar (11) is shorter than a width of the weld seam adjacent to the respective longitudinal link (12, 13).

2. The method according to claim 1, further comprising making each of the weld seams (14) with unequal widths such that a ratio (X=I/L) between the width (I) of the respective weld seam (14) adjacent to the torsion bar (11) and the width (L) of the weld seam (14) adjacent to the longitudinal link (12, 13) concerned has a value of between 0.36 and 0.8.

3. The method according to claim 2, further comprising making each of the weld seams such that the ratio (X=I/L) between the width (I) of the respective weld seam (14) adjacent to the torsion bar (11) and the width (L) of the weld seam (14) adjacent to the longitudinal link (12, 13) concerned has a value of between 0.5 and 0.8.

4. The method according to claim 3, further comprising making each of the weld seams such that the ratio (X=I/L) between the width (I) of the respective weld seam (14) adjacent to the torsion bar (11) and the width (L) of the weld seam (14) adjacent to the longitudinal link (12, 13) concerned has a value of between 0.6 and 0.7.

5. The method according to claim 1, further comprising making each of the weld seams (14) with a root layer (15), at least one intermediate layer (16) and a covering layer (17), such that the root layer (15), the at least one intermediate layer (16) and the covering layer (17) are produced using individual welding parameters.

6. The method according to claim 5, further comprising producing each of the root layer (15), the at least one intermediate layer (16) and the covering layer by metal-active-gas welding such that the resulting weld seam has a hardness between 200 and 300 HV1 both in a weld metal area and in a heat-affected zone.

7. The method according to claim 6, further comprising operating a fixed welding torch with a welding current between 240 and 340 amperes and a welding voltage between 29 and 33 volts, and moving the longitudinal links and the torsion bar to be welded relative to the fixed welding torch at a speed between 0.30 and 0.50 m/min to produce the root layer (15).

8. The method according to claim 7, further comprising operating the fixed welding torch with a welding current between 230 and 340 amperes and a welding voltage between 28 and 31 volts, and moving the longitudinal links and the torsion bar to be welded relative to the fixed welding torch at a speed between 0.25 and 0.40 m/min, and the welding torch undergoing an oscillation movement of a relatively small amplitude perpendicularly to the movement of the longitudinal links and the torsion bar to produce the at least one intermediate layer (16).

9. The method according to claim 8, further comprising operating the fixed welding torch with a welding current between 210 and 315 amperes and a welding voltage between 27 and 31 volts, and moving the longitudinal links and the torsion bar to be welded relative to the fixed welding torch at a speed between 0.20 and 0.55 m/min, and the welding torch undergoing an oscillation movement of a relatively large amplitude perpendicularly to the movement of the longitudinal links and the torsion bar to produce the covering layer (17).

10. The method according to claim 5, further comprising interposing a welding interval of between 20 and 120 seconds between the welding of the root layer (15), the at least one intermediate layer (16) and the covering layer (17).

11. The method according to claim 1, further comprising preheating the longitudinal links (12, 13) and the torsion bar (11) to a temperature of between 120° and 150° C. immediately before welding.

12. The method according to claim 1, further comprising subjecting the longitudinal links (12, 13) and the torsion bar (11) to a shot peening treatment after welding thereof to increase a strength thereof.

13. The method according to claim 1, further comprising using an alloy containing at least manganese, nickel and molybdenum as a welding filler.

14. A stabilizer (10) for a motor vehicle, the stabilizer comprising:
   a torsion bar (11) and longitudinal links (12, 13),
   the longitudinal links (12, 13) being connected to the torsion bar (11) in each case by welding, and each of the longitudinal links (12, 13) being welded to a section of the torsion bar (11) on both sides by a respective multilayer weld seam (14), and
   each weld seam (14) being made with unequal widths such that a width of the respective weld seam (14) adjacent to the torsion bar (11) is shorter than its width adjacent to the longitudinal link (12, 13) concerned.

15. The stabilizer according to claim 14, wherein a ratio (X=I/L) between the width (I) of each weld seam (14) adjacent to the torsion bar (11) and the width (L) of the weld seam (14) adjacent to the longitudinal link (12, 13) concerned has a value between 0.36 and 0.8.

16. The stabilizer according to claim 14, wherein at least a covering layer (17) of the respective weld seam (14) merges tangentially into the torsion bar (11) and also tangentially into the longitudinal link (12, 13) concerned.

17. The stabilizer according to claim 14, wherein each of the weld seams is made with a root layer (15), at least one intermediate layer (16) and a covering layer (17), and the root layer (15), the at least one intermediate layer (16) and the covering layer (17) are made such that the weld seam (14) concerned has, in each case, a hardness between 200 and 300 HV1 both in a weld material area and also in a heat-affected zone.

18. A method of producing a motor vehicle stabilizer that includes a torsion bar and first and second longitudinal links, the first and the second longitudinal links are each connected to the torsion bar by welding, the method comprising:

heat-treating the first and the second longitudinal links and the torsion bar before welding the first and the second longitudinal links to the torsion bar, and each of the first and the second longitudinal links has an inner side and an opposite outer side and the torsion bar has opposed first and second ends;

welding the first end of the torsion bar to the first longitudinal link with a multilayer weld seam formed on each of the inner and the outer sides of the first longitudinal link, and welding the second end of the torsion bar to the second longitudinal link with a multilayer weld seam formed on each of the inner and the outer sides of the second longitudinal link;

forming the multilayer weld seam between the first end of the torsion bar and the outer side of the first longitudinal link such that a width of the multilayer weld seam along the torsion bar is shorter than a width of the multilayer weld seam along the outer side of the first longitudinal link, and forming the multilayer weld seam between the first end of the torsion bar and the inner side of the first longitudinal link such that a width of the multilayer weld seam along the torsion bar is shorter than a width of the multilayer weld seam along the inner side of the first longitudinal link; and forming the multilayer weld seam between the second end of the torsion bar and the outer side of the second longitudinal link such that a width of the multilayer weld seam along the torsion bar is shorter than a width of the multilayer weld seam along the outer side of the second longitudinal link, and forming the multilayer weld seam between the second end of the torsion bar and the inner side of the second longitudinal link such that a width of the multilayer weld seam along the torsion bar is shorter than a width of the multilayer weld seam along the inner side of the second longitudinal link.

* * * * *